United States Patent
Grimaud et al.

(10) Patent No.: US 10,074,121 B2
(45) Date of Patent: Sep. 11, 2018

(54) SHOPPER HELPER

(71) Applicant: DASSAULT SYSTEMES, Velizy, Villacoublay (FR)

(72) Inventors: Jean-Jacques Grimaud, Winchester, MA (US); William Martin, Forth Worth, TX (US)

(73) Assignee: DASSAULT SYSTEMES, Velizy, Villacoublay (FR)

( * ) Notice: Subject to any disclaimer, the term of this patent is extended or adjusted under 35 U.S.C. 154(b) by 560 days.

(21) Appl. No.: 13/922,591

(22) Filed: Jun. 20, 2013

(65) Prior Publication Data

US 2014/0379524 A1 Dec. 25, 2014

(51) Int. Cl.
*G06Q 30/06* (2012.01)
*G06T 13/20* (2011.01)
*G06F 3/048* (2013.01)
*G06Q 30/02* (2012.01)

(52) U.S. Cl.
CPC ......... *G06Q 30/0613* (2013.01); *G06F 3/048* (2013.01); *G06Q 30/0269* (2013.01); *G06Q 30/0601* (2013.01); *G06Q 30/0631* (2013.01); *G06T 13/20* (2013.01)

(58) Field of Classification Search
CPC .... G06Q 30/06–30/0645; G06Q 30/08; G06Q 30/0269; G06F 3/048; G06T 13/20
USPC ................................. 705/26.1–27.2
See application file for complete search history.

(56) References Cited

U.S. PATENT DOCUMENTS

| 6,175,803 | B1 | 1/2001 | Chowanic et al. |
|---|---|---|---|
| 7,042,345 | B2 | 5/2006 | Ellis |
| 7,343,328 | B1 | 3/2008 | Smith et al. |
| 7,685,023 | B1 | 3/2010 | Abraham et al. |
| 8,049,621 | B1 | 11/2011 | Egan |
| 8,941,645 | B2 | 1/2015 | Grimaud |
| 2005/0096933 | A1 | 5/2005 | Collins et al. |
| 2006/0175403 | A1* | 8/2006 | Fossen McConnell ....... G06Q 30/02 235/385 |

(Continued)

FOREIGN PATENT DOCUMENTS

| JP | 2000-281204 | 10/2000 |
|---|---|---|
| JP | 2002-366621 | 12/2002 |

(Continued)

OTHER PUBLICATIONS

"San-Martin Sonia, How can a mobile vendor get satisfied customers, Nov. 2, 2013, Emerald. vol. 113, pp. 156-170" (Year: 2013).*
European Search Report for EP 09 30 6355 dated Apr. 22, 2010.
Noort, A., et al. "Integrating Part and Assembly Modelling", Computer-Aided Design, 34:12, pp. 899-912, Oct. 1, 2002.

(Continued)

*Primary Examiner* — Michael Misiaszek
*Assistant Examiner* — Matthew W Todd
(74) *Attorney, Agent, or Firm* — Hamilton, Brook, Smith & Reynolds, P.C.

(57) ABSTRACT

In one embodiment, a method includes monitoring an action of an individual or a certain consumer and maintaining a database stored in a memory personal to the consumer. The database can have an indication of preferences of the consumer and a purchase history of the individual consumer. The database can be based on the monitored action of the consumer. The method can further include providing a suggested product to the consumer based on the maintained database.

18 Claims, 10 Drawing Sheets

(56) References Cited

U.S. PATENT DOCUMENTS

| | | | |
|---|---|---|---|
| 2007/0179867 A1* | 8/2007 | Glazer | G06Q 30/0253 705/26.43 |
| 2009/0063307 A1 | 3/2009 | Groenovelt et al. | |
| 2009/0138113 A1 | 5/2009 | Hoguet | |
| 2009/0138376 A1* | 5/2009 | Smyers | G06Q 30/02 705/26.1 |
| 2009/0201288 A1 | 8/2009 | Fischer et al. | |
| 2010/0076959 A1 | 3/2010 | Ramani et al. | |
| 2010/0161400 A1* | 6/2010 | Snodgrass | G06Q 30/02 705/14.16 |
| 2010/0171826 A1 | 7/2010 | Hamilton et al. | |
| 2011/0029382 A1* | 2/2011 | Narasimhan | G06Q 30/02 705/14.52 |
| 2011/0115909 A1 | 5/2011 | Sternberg et al. | |
| 2011/0214082 A1* | 9/2011 | Osterhout | G02B 27/017 715/773 |
| 2012/0268392 A1 | 11/2012 | Kalin | |
| 2012/0284145 A1* | 11/2012 | Kalin | G06Q 30/0603 705/26.7 |
| 2012/0303477 A1* | 11/2012 | Ben-Itzhak | G06Q 30/02 705/26.7 |
| 2012/0330781 A1 | 12/2012 | Borrero | |
| 2013/0041778 A1* | 2/2013 | Nativ | G06Q 30/0633 705/26.62 |
| 2013/0268392 A1* | 10/2013 | Chateau-Artaud | G06Q 30/0282 705/26.7 |
| 2013/0300729 A1 | 11/2013 | Grimaud | |
| 2013/0335573 A1* | 12/2013 | Forutanpour | G06F 3/011 348/158 |
| 2014/0379524 A1 | 12/2014 | Grimaud et al. | |

FOREIGN PATENT DOCUMENTS

| | | |
|---|---|---|
| JP | 2004504670 A | 2/2004 |
| JP | 2006-256856 | 3/2005 |
| JP | 2005-321639 | 11/2005 |
| JP | 2008-117113 | 5/2008 |
| JP | 2008-242938 | 10/2008 |
| JP | 2009-187482 | 8/2009 |
| WO | WO 00/03329 | 1/2000 |

OTHER PUBLICATIONS

Finger, S., et al. "A Transformational Approach to Mechanical Design Using a Bond Graph Grammar", American Society of Mechanical Engineers, Design Engineering Division, vol. 17, pp. 107-116, 1989.

Molli, P., et al. "Using the Transformational Approach to Build a Safe and Generic Data Synchronizer", Proceedings to the International ACM Siggroup Conference Supporting Group-Work—Group '03: Proceedings of the 2003 Association for Computing Machinery, US, pp. 212-220, 2003.

European Search Report for EP 14 16 8670 dated Jul. 1, 2014.

Daniel, B. H., et al., "Student-Sensitive Multimodal Explanation Generation for 3D Learning Environments", from *American Association of Artificial Intelligence Proceedings*, 7 pages (1999).

Everett, S. S., et al., "A Natural Language Interface for Virtual Reality Systems", Navy Center for Artificial Intelligence, 2 pages. (date unavailable).

Graesser, A. C., et al., "Teaching Tactics and Dialog in AutoTutor", *International Journal of Artificial Intelligence in Education* (2001).

Miller, George A., "The Magical Number Seven, Plus or Minus Two Some Limits on Our Capacity for Processing Information", *Psychological Review*, 101(2): 343-352. (date unavailable).

Sowa, T. and Wachsmuth, I., "Understanding Coverbal Dimensional Gestures in a Virtual Design Environment", Paper presented at ESCA Workshop on Interactive Dialogue in Multi-Modal Systems (IDS-99), Kloster Irsee, Germany (Jun. 22-25, 1999).

Wankat, P. C. and Oreovicz, F. S., "Chapter 14: Models of Cognitive Development: Piaget and Perry", In *Teaching Engineering*, (NY: McGraw-Hill), pp. 264-283 (1993).

European Search Report dated Oct. 22, 2013 in European Application No. EP 13 17 1488, 3 pages.

https://www.e-semble.com/en/Products/WVR/in-generalE-semble/XVR, Mar. 6, 2012.

Helal, A., et al. "An Intergrated Navigation System for Visually Impaired and Disabled", Proceedings. Fifth International Symposium on Wearable Computers. 2001.

Doswell, J.T., The Justopia Group/ Augumented Learning: Context-Aware MobileAugmented Reality Architecture for Learning/ Sixth International Conference on Advanced Learning Technologies, 2006.

Ram, S. "The People Sensor: A Mobility Aid for the Visually Impaired ", IEEE 1998, pp. 166-167.

www.hitachi.co.jp/HAND/ "Power95", HITAC, Hitachi, Ltd., p. 25, Mar. 1, 1999.

* cited by examiner

SHOPPER HELPER

RELATED APPLICATION

This application is related to U.S. patent application Ser. No. 13/494,223, "Symbiotic Helper" by Jean Jacques Grimaud, which is incorporated by reference in its entirety.

BACKGROUND

In general, retailers manage product information and specifications for the products and services they offer using data from manufacturers and suppliers. They also obtain and use customer data in one of two ways. In a first traditional way, retailers can acquire data from one or more big data sources already aggregated in segments. They use the acquired data in order to create product or service clusters or segments, then analyze the created clusters or segments, and are able to predict future purchases of a consumer segment. The acquired data may include personal data of the consumer from social networking sites, or other sources of personal data, or purchasing data and/or location-based records (e.g., from a cellular network, search engine, and/or mapping or geolocation company), any or all of which is aggregated at the source when regulations require.

In a second way, retailers can also acquire personal data from aggregators, such as Enliken, Intelius, Spokeo, etc., and use the personal data to predict future purchases or desires. A retailer may also use personal data it collected itself from customers, including personal data (e.g., address, age, etc.), transactional data, and/or wishlists, either in isolation or in combination with other acquired data.

The traditional approach to providing both in-store and online shopping experiences is to cause the consumer to spend as much time as possible in the store or on the website. Many retailers believe that a shopper spending more time in a shopping experience, is the only method to generate more sales as a result of additional time spent shopping by the consumer.

Today, the quality of big data available is not sufficient to ensure that the costs of a retailer acquiring, storing and processing the data outweigh the benefits of the use of the big data. While correlation with a purchasing behavior can be established in a given segment, the causality is far from being clear and the proper use of the results can be doubtful. In addition, consumers have increasingly become sensitive to sharing personal or identifying data with retailers beyond information necessary to make a purchase. In some cases, a consumer may input false data to prevent future contact from the retailer if the consumer perceives future contact as annoying or intrusive.

Governments and organizations are also becoming more involved with regulating acquisition and storage of consumer data due to occasional data leaks of personally identifiable information and financial information, and are considering forcing retailers and other online entities to implement privacy rules. Furthermore, increasing numbers of consumers manage personal data on smartphones and mobile devices locally and use the data in transactions as needed, which provides less available data to retailers. With less available data about consumers, a retailer can have difficulty providing accurate product recommendations to its consumers. Retailers may also realign their assets towards shopper service over data crunching.

SUMMARY

Accordingly, in one embodiment of the present invention, a purchasing helper (or shopping helper) enables a consumer to find what he or she wants from the retailer as fast as possible, allowing return to the short list of desired products faster. The purchasing helper shortens shopping sessions by making them more effective and more likely to result in a purchase that is satisfactory to the consumer.

In one embodiment, the present invention is related to computer programs or systems that enable a retailer to assist shoppers with intelligent suggestions. The "purchasing helper" or "shopping helper" may be embodied as a stand-alone computer program, a wearable computer, a network-connected computer program, and online shopping website, and/or a mobile application.

Three types of data can indicate a future purchase of a consumer. A first type of data is intended usage, context and environment data. This data defines a purpose, location, a manner, and a length of time that a product is used to achieve specific goals of the consumer. The specific goals of the consumer and the requirements to reach those goals may not be completely defined, as the consumer may not be aware of his or her needs in a product. The consumer can become aware of his or her needs either before or during shopping, as the consumer comes to interact with a product or a virtual representation of the product.

The consumer provides this first type of data to the purchasing helper. The purchasing helper is configured to ask the consumer adaptive questions to understand the usage, context and environment of the product to be purchased. The questions vary by product supercategory and product category. As the purchasing helper acquires data about the consumer, the frequency and the nature of the questions can be adjusted or automatically adjusted (e.g., being decreased as the purchasing helper knows more about the consumer).

A second type of data is specifications of the product. Specifications of the product include dimensions, physical attributes, emotional attributes and functions of the product.

A third type of data is transactional attributes of the product. Transactional attributes include price, price per unit, payment mode, delivery mode, delivery time, convenience, etc. A retailer typically provides the specifications of the product and the transactional attributes of the product to the shopping helper, however, the Internet/cloud (e.g., from a search or content aggregation system) can also provide the specifications and transactional attributes. However, in certain cases, a consumer can provide specifications or transactional attributes of the product. In some cases, transactional attributes may be dependent on the specifications of the product or the configuration of multiple products, for example, when the product is sold as a set of products.

Other product recommendation systems do not ask the consumer questions to help the consumer make a purchase. Rather, they consider actions of the user and attempt to map those actions to recommended products. For example, a retailer recommends books to a user who has recently purchased books. As another example, a retailer recommends songs to a user who has recently purchased songs. The retailer deploys these recommendation systems on its Internet/cloud end of the network. The retailer manages each recommendation system, not the consumer purchasing the product.

The product recommendation systems recommend products based on data from a large population of users, for example, by using a metric measuring increased revenue for the website. They further employ a single model for all users visiting the website, or if they use multiple models, define the models based on large demographics of portions of the population. However, they do not employ models adapted for each individual user.

In an education environment, adaptive user models facilitate student learning and improve the content of tests given to the student. Learning engines adapt the user model automatically based on the actions of the user. However, these learning engines can create false positives, which lead students on misleading learning paths on their learning map.

The purchasing helper provides the consumer with a different solution. The user model of the purchasing helper becomes specific to each consumer. In certain cases, the consumer shops only for himself or herself. In other cases, the consumer shops for multiple consumers, for example, other consumers in his or her household.

The consumer's purchases are, in general, independent of one another, with the exception of purchases such as accessories, chinaware bought as a set, etc. Typically, a consumer purchases between 150 to 200 unique products per year, most of them independent of one another. By contrast, educational courses are a compilation of knowledge 'bricks,' each of which requires the understanding of the previous brick to proceed to the next course level. Typical recommendation systems tend to be tied to a given category of product or products and are designed provide a recommendation to a large population, instead of being adapted to an individual.

The purchasing helper can pose questions to the consumer, in particular questions related to the intended usage, context and environment of the purchase, to better understand requirements for the purchase of the individual consumer. Current recommendation systems do not ask the consumer questions about the intended purchase; they are concerned with product specifications and transactional attributes.

The consumer generally chooses from among multiple products for his or her purchase. Some of these products can be found by the consumer, while others can be found by the purchasing helper. The consumer decides whether to decline or purchase a product, and which item to purchase. To contrast the purchasing helper with an educational adaptive model, a student studying for a multiple-choice exam has to select a correct answer among the limited set of multiple choices presented to him/her. The student has no ability on his or her own to seek out or enter additional answers other than the multiple choices presented. In contrast, the consumer of the purchasing helper can seek out additional products other than the initial products presented by the retailer.

Typical retailer websites and website applications display collections of products on pages. Each page shows a product of list of products. Typically, the retailer website only displays a defined number of 2D representations of products per page. Displaying products in pages makes it difficult to select and to compare products of the collection on the top and bottom of the same page or compare products from different pages.

Collections of products can also be displayed in virtual stores. A virtual store is a 3D representation of a store that depicts a real store with multiple instances of the same product for most of the products of the collection. These virtual store representations further show furniture, which creates a visual obstacle to view the collection of products and does not help the user select a products of the collection, but rather only serves to make the user relate the virtual environment to a physical environment.

In one embodiment, the purchasing helper presents each product of a collection in three-dimensions (3D). The collection can be displayed on a single plane without presenting any furniture or fixtures. The user interface can respond to zoom, pan and pitch commands, enabling a continuous uniform view of the products of the collection. The user can select a subset of these products either by marking some of the products or by filtering the products using criteria (e.g., attributes). Each product can be selected, manipulated, and rotated along its three axes of freedom to observe its exterior, or cross-section of its interior. The product can also be manipulated by manipulating product features such as a hinge, a drawer, or a twisting knob, etc. The purchasing helper can also play audio, set alarms, and perform voice recognition, voice synthesis, and natural language.

In one embodiment, a method includes monitoring an action of a consumer and maintaining a database stored in a memory personal to the consumer. The database can have an indication of preferences of the consumer and a purchase history of the consumer. The database can be based on the monitored action of the consumer. The method can further include providing a suggested product to the consumer based on the maintained database.

In another embodiment, the method can include enabling the consumer to select at least at least a portion of the database and further enabling the consumer to share the portion of the database with a third party.

In a further embodiment, the method can include initializing the database based on an identifier of the consumer (e.g., within a household), a plurality of available products, and/or the purchase history by building a tree for a product category of each of the plurality of available products.

In yet another embodiment, the method can include enabling selection of at least one attribute of a category of a product. Maintaining the database can include maintaining the database by modifying the tree based on an order of the at least one attributes selected by the consumer.

In another embodiment, the method can include ranking a plurality of products. Each product can be associated with specifications and transactional attributes. The ranking can be based on a past observed action of the consumer, specifications of each product, indicated needs of the consumer, and/or a transactional attribute of each product. The indicated needs of the consumer can be in terms of product usage, context of use, and environment of use. The method can further include, responsive to user choice, adjusting the database based on a chosen product by the consumer. The transactional attribute can include a price of the product, a price per unit of the product, a payment mode of the product, a delivery mode of the product, a delivery length of the product, and/or delivery provider of the product.

In yet another embodiment, the method can further include presenting a representation of a collection of products in three dimensions in a single plane as part of a virtual store. The method can further include enabling at least one of zooming, panning, and pitch manipulation of the representation of the collection. The method can additionally include enabling at least one of selection, translation, rotation, and manipulation of features of each product of the collection. Presenting the representation can include presenting the representation in a head worn computer.

In another embodiment, maintaining the database can be performed by a background process monitoring the consumer's activities with one or more third-party.

In a further embodiment, the method can include issuing, to the consumer, a question to determine a need of the consumer. The method can additionally include, responsive to the question, receiving an answer indicating the need of the consumer. Providing the suggested product can be based on the answer, specifications of the suggested product, and/or transactional attributes of the suggested product.

In another embodiment, a system includes a memory being personal to the consumer. The system can further include a user interface module configured to monitor an action of the consumer. The system can additionally include a maintenance module configured to maintain a database stored in the memory personal to the consumer. The database can have an indication of preferences of the consumer and a purchase history of the consumer. The database can be based on the monitored action of the consumer. The system can further include a product suggestion module configured to provide a suggested product to the consumer based on the maintained database.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

In one embodiment, a purchasing helper (e.g., "purchasing helper" or "shopping helper") is an asynchronous consumer model that adapts to changing consumer habits. The purchasing helper recommends products to a consumer based on online (or offline) retailer information, in-store information, and additional online information (e.g., consumer information). The purchasing helper also employs a variety of technologies, such as QR codes, RFID, voice recognition, voice synthesis, and other hardware-driven technology, such as a wearable computing device like Google™ Glass, to provide its user interface and collect data.

The purchasing helper can track consumer interests according to categories and/or activities, purchase intentions, other values (e.g., where a product is made), or other categorical criteria. Other outside stimuli may also be used to help the consumer, such as information related to a category of goods or services, or alignment with purchase intentions.

The purchasing helper can assist the consumer in finding products/services and/or choosing products/services based on any of a number of items, such as priorities, choices, opportunities, purchase planning, time management, risk or safety factors, and/or feelings of control.

The purchasing helper is initialized by (1) accessing a purchase history of a consumer through a retailer; (2) providing a context to the purchase history; and (3) pre-populating categories and supercategories of products. As the consumer purchases products, the purchasing helper adjusts the stored information. However, the purchasing helper also adjusts the stored information when the consumer does not make a purchase. That is, the purchasing helper adjusts the stored information even when the user does not purchase a particular product, instead indicating that the user considered the particular product and chose not to purchase it. Initialization includes storing a list of products/services offered or sold by the retailer over time in digital form. The purchasing helper lists the names and 3D representations (where applicable) of products/services that have been purchased by supercategory and, within those, by category. A supercategory is a set of products grouped by a descriptor. The descriptor can be a broad category, such as a section of a store like "Books" or "Home and Garden." The supercategory can also include categories or sub-categories. The categories are products also grouped by a descriptor. The descriptor of the category can be more narrow than the descriptor of the supercategory. For example, if the supercategory is "Books," categories within the supercategory could include "non-fiction," "fiction," "history," "memoirs," "science fiction," "fantasy," and "historical fiction."

The purchasing helper may also organize the displayed products/services shown to a particular consumer based on indicated intended recipient(s) of the product/service (e.g., the consumer himself or herself, the consumer's family, children, or friends, etc.). The purchasing helper also stores a consumer decision tree for each supercategory or category of purchases made during a specified history period. For each purchase made by the consumer, the purchasing helper traverses the corresponding consumer decision tree in reverse. During this analysis, the purchasing helper determines the choices the consumer made during each purchase and compares them to a historical normalized distribution. The purchasing helper also determines which products/services the retailer has stopped offering for sale and attempts to determine and replace those products/services with substitute products that have already been purchased or may be available for purchase.

The purchasing helper employs a database to store product-specific data from the retailer, including (1) Universal Product Codes (UPC) and other product identifiers such as European Article Number (EAN) or International Article Number (EAN); (2) Product/Service titles; (3) Brand names; (4) Supplier information; (5) Product/Service descriptions; (6) Assortment information; (7) Sub-assortment information; (8) Customer decision tree information; (9) Product dimensions; (10) Product weights; (11) Product/Service nature; (12) Presentation information; (13) Product colors; (14) Product sizes; (15) Product/Service recommended prices; and (16) Product/Service categories.

The purchasing helper also presents 3D model representations of products to the consumer to facilitate: (1) discovering or recognizing the packaging of the product; (2) determining contents of a product (e.g., ingredients, parts, assembly instructions, delivery information, post-assembly images); (3) describing assortments and the consumer decision tree; and/or (4) describing remaining products on a shopping list. The purchasing helper may also use 3D models to facilitate customization of products such as apparel, decorations (e.g., lamps, window shades, or other interior or exterior decorations), and/or motors. The purchasing helper may also provide 3D models to a 3D printing device to create a physical manifestation of the product represented by the 3D model.

The purchasing helper also creates product/service specifications from product/service descriptions to facilitate a better shopping experience. For example, when a product/service specifications are unavailable, the purchasing helper can create specifications of the product by text-mining the description for keywords.

In one embodiment, the data of the purchasing helper is pre-populated. This facilitates automating purchase history analysis using the consumer decision tree and/or the purchase history provided by the retailer. Notably, the data may be personal to the consumer or may be more general. The purchasing helper may also add 3D representations of products based on UPC codes, such as from an online database. Moreover, the purchasing helper may determine and store an attitude of the consumer towards the retailer. The attitude towards the retailer may relate to prices of products at the retailer, depth of assortment, quality of products, return or exchange policies, on-time delivery rates, trust, relevance of provided information (e.g., lack of spam email), corporate responsibility, and/or eco-friendliness or sustainability.

Additional data used by the purchasing helper includes context-specific criteria or supercategories, such as sections. Examples of supercategories can include books, movies, music and games, electronics & computers, home & garden, home improvement & tools, health & beauty care, toys, kids & baby, clothing, shoes & accessories, sports & outdoors, motors, collectibles & art, and industrial & scientific. Other supercategories (or sections) can be provided by the retailer, however.

The purchasing helper also can show a thumbnail or identifier of a recipient for each product/service on the consumer's shopping list. The consumer can change the identifier as necessary.

The purchasing helper also enables the consumer to set delivery modes. For example, the consumer may pick up the purchased products/services at a store or have the products shipped.

Online and/or in-store use of the purchasing helper can be enhanced by other stimuli, such as videos of the products/services in use, smell, etc. The purchasing helper can show products in 2D or 3D based on the user's needs and availability of 3D models of the products.

The Internet employs webpages, which often are not the best medium for comparing and selecting products from a large collection. For example, a user can have difficulty comparing a product from the top of the page with an item from the bottom of it, and even more difficulty comparing products displayed on separate pages. Narrowing product searches with nouns and adjectives can help filter the pages, however, the consumer still has to choose the correct additional search terms to avoid to overfiltering a possible desired product.

A 3D-store can represent a complete CAD product and the 3D representations of its subassemblies tied to the CAD by employing a turning table to position them. Such a turning table can present a visual representation of an assembly, but can fail to properly represent items because the orientation of the items needs to be user-facing all the time. This can be described as a "lazy susan" approach. The turntable does not have the concept of "presentation to a consumer," as in a store. In addition, a large collection includes too many items for a turntable.

A store has physical shelf space and floor space for products. The purchasing helper needs to retain these concepts because they are familiar to users. The purchasing helper uses these concepts in categorizing products. The visible "consumer decision tree" removes the complexity of selecting the proper additional search word. Navigating on a floor or alongside a linear gondola is simple for the consumer. There can be cases where the product helper presents 2D images of products on the representation of a gondola, but the product helper generally uses a 3D navigation concept whenever possible.

Figure 1:
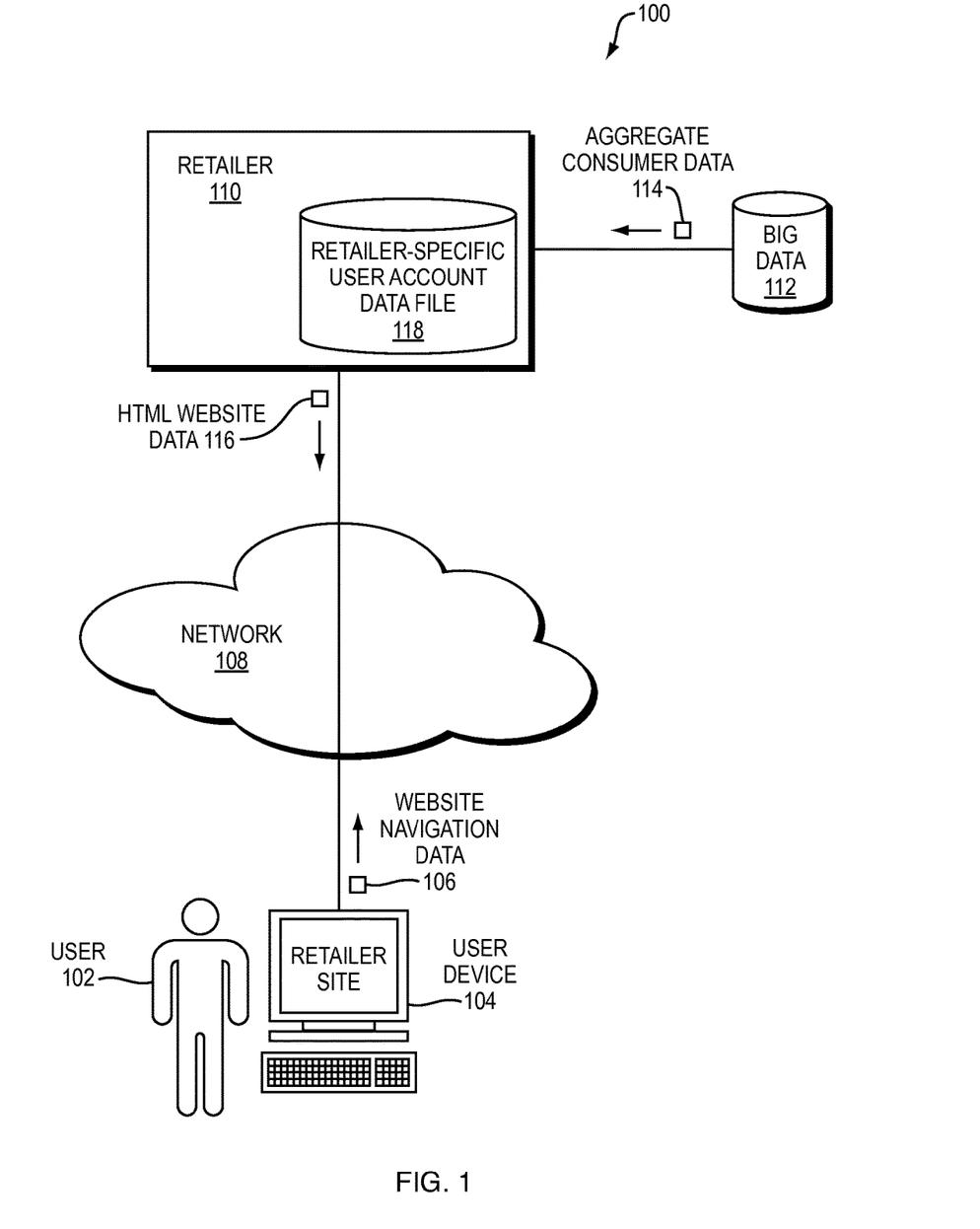
FIG. 1 is a block diagram illustrating example embodiment of a retailer interfacing with a user device.

FIG. 1 is a block diagram 100 illustrating example embodiment of a retailer 110 interfacing with a user device 104. The user device 104 can be a personal computer or mobile device such as a tablet or smartphone. The user device 104 is connected to a network 108, for example, by WiFi, 4G, Ethernet, or other networking protocol. A user 102 employs a user device 104 to access a website of the retailer 110. The user device 104, responsive to interaction with the user 102, forwards website navigation data 106 over a network 108 to the retailer 110. The retailer 110, based on the website navigation data 106, updates a retailer-specific user account data file 118. The retailer 110 uses the retailer-specific user account data file 118 to personalize future interactions with the user 102. The retailer 110 further employs big data 112 to receive aggregate consumer data 114. The aggregate consumer data 114 does not contain any information specific to the user 102. However, the retailer 110 can interpret actions by the user 102 by comparing the actions to the aggregate consumer data 114 from the general population. The retailer 110 then returns HTML website data 116 to the user device 104.

Figure 2:
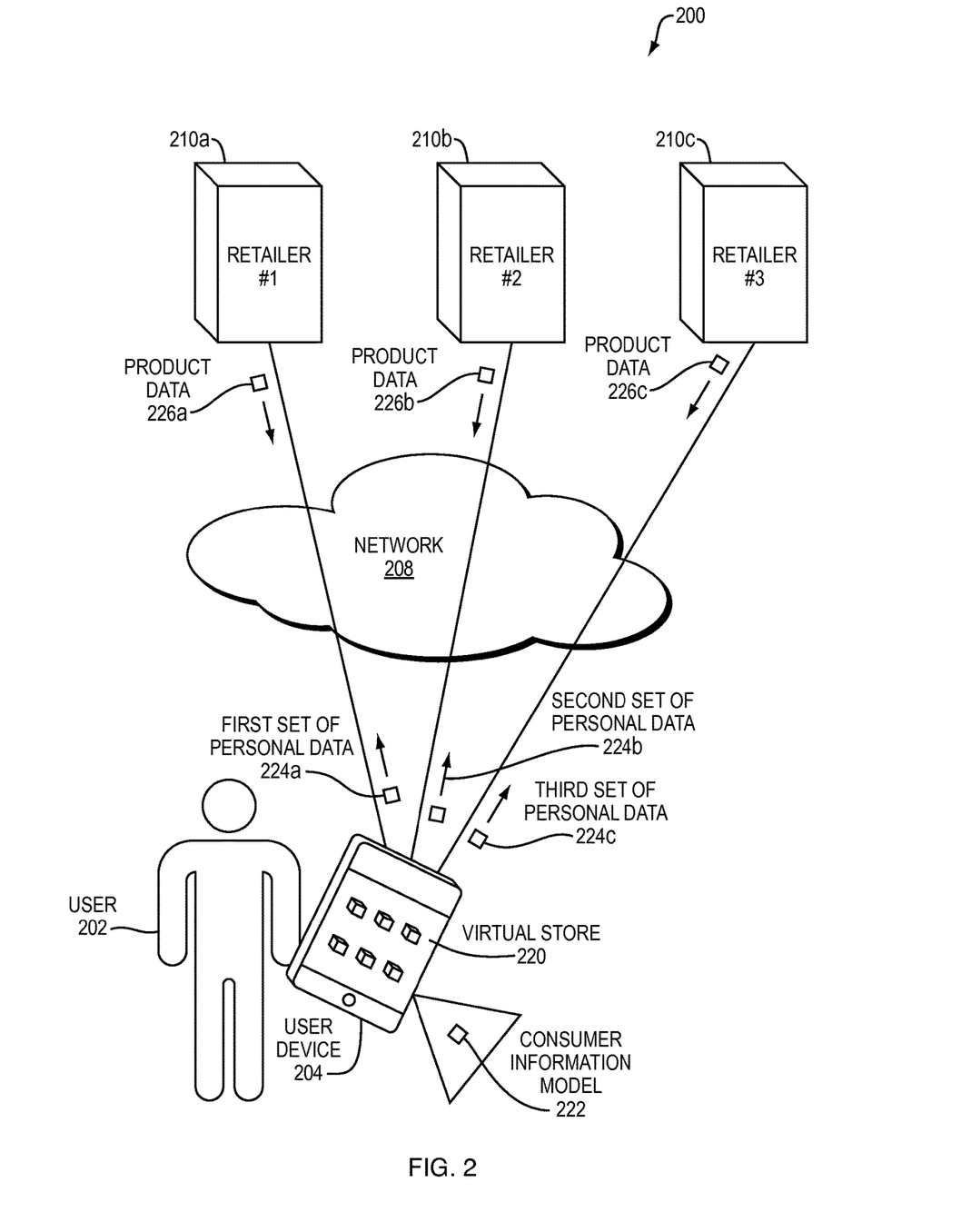
FIG. 2 is a block diagram illustrating an example embodiment of a user using a user device to interface with a plurality of retailers.

FIG. 2 is a block diagram 200 illustrating an example embodiment of a user 202 using a user device 204 to interface with a plurality of retailers 210a-c. The user device 204 displays a virtual store 220 based on a consumer information model 222. The user device 204 is configured to forward personal data 224a-c to the respective retailers 210a-c over a network 208 based on privacy information. The privacy information is selections of data the user 202 indicates can be shared with each particular retailer 224a-c.

In this manner, a first set of personal data 224a can be forwarded to retailer #1 210a, a second set of personal data 224b can be sent to retailer #2 210b, and a third set of personal data 224c can be sent to retailer #3 210C. Responsive to the sets of personal data 224a-c, each retailer returns product data 226a-c to the user device 204. The user device 204 can present the relevant products available at the retailers #1-3 210a-c to the user 202 in the virtual store 220. Responsive to the virtual store 220 presenting the product data 226a-c to the user, the user 202 can select and purchase one of the suggested products, or can navigate to a different product to purchase. Based on the purchase by the user 202, the user device 204 can update the consumer information model 222. This updates the sets of personal data 224 sent to retailers and further tailors the experience of the virtual store 220 to the user 202.

Figure 3:
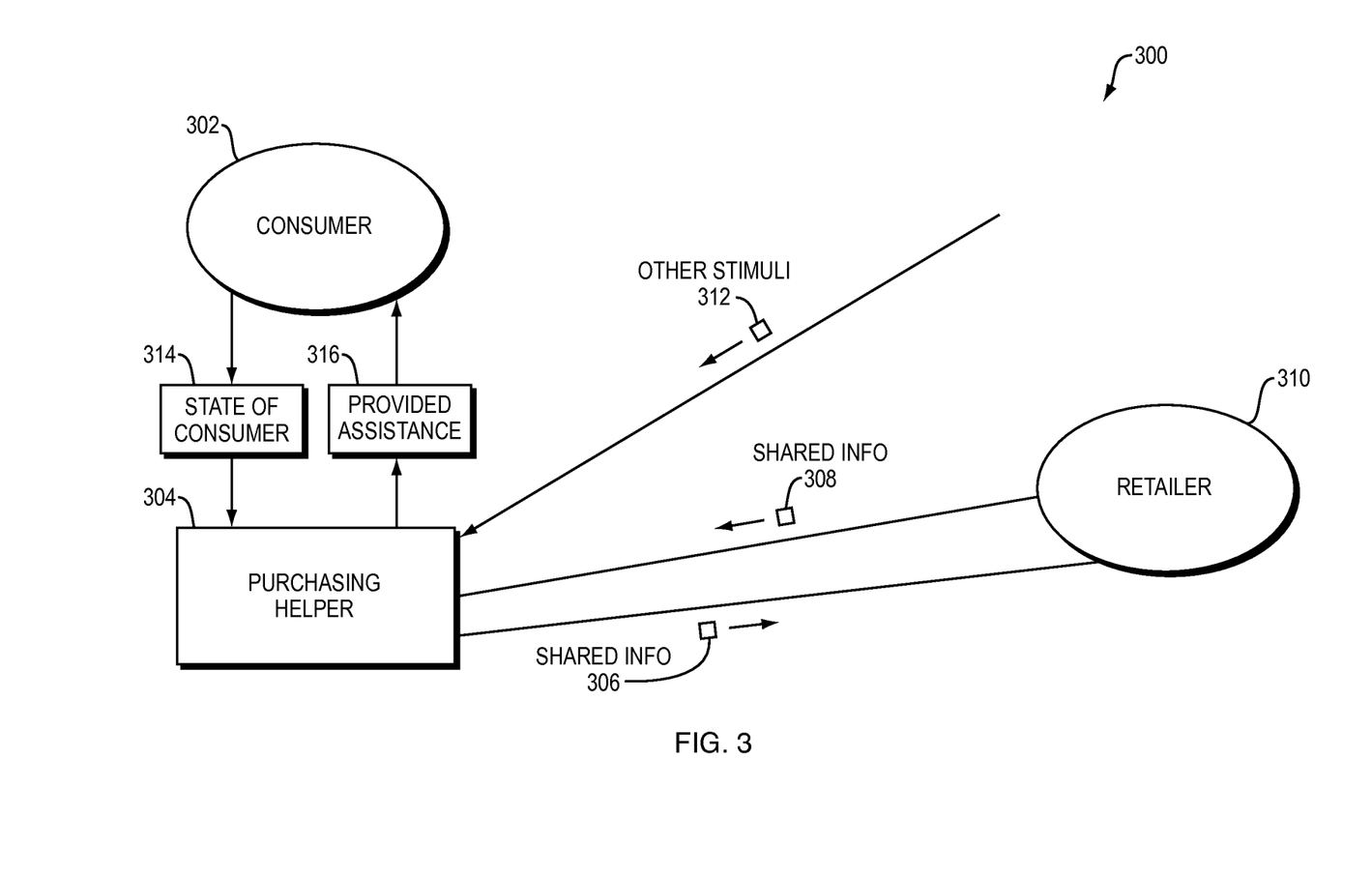
FIG. 3 is a diagram illustrating an example embodiment of the present invention.

FIG. 3 is a diagram 300 illustrating an example embodiment of the present invention. A consumer 302, such as the user 202 of FIG. 2, employs a purchasing helper 304. The consumer 302 inputs a state of the consumer 314 to the purchasing helper 304. The state of the consumer 314 includes the consumer's 302 needs for the product, the consumer's 302 budget, or any factor that can influence the consumer's 302 purchase. The consumer 302 can input the state of the consumer 314 by various techniques such as manual entry on a keyboard, mouse, or touchscreen, voice input, voice synthesis, natural language understanding, or image analysis. Conversely, the purchasing helper 304 monitors the activity of the consumer 302 through sensors, and through the use of other applications by the consumer 302, for example by checking which URLs have been visited outside of the shopping helper application. The purchasing helper 304 can also receive other stimuli 312 from other sources. Purchasing helper 304 then interfaces with a retailer 310, such as the retailers 210a-c of FIG. 2, by sending shared information 306 to the retailer. The shared information 306 can be information from the consumer information model of the purchasing helper 304. In response, the retailer 310 can reply with shared info 308 about its products to the purchasing helper 304. The purchasing helper 304 can then present product suggestions and rank product lists to the consumer 302. Purchasing helper 304 sends the product suggestions and ranked product lists to the consumer as provided assistance 316.

Figure 4:
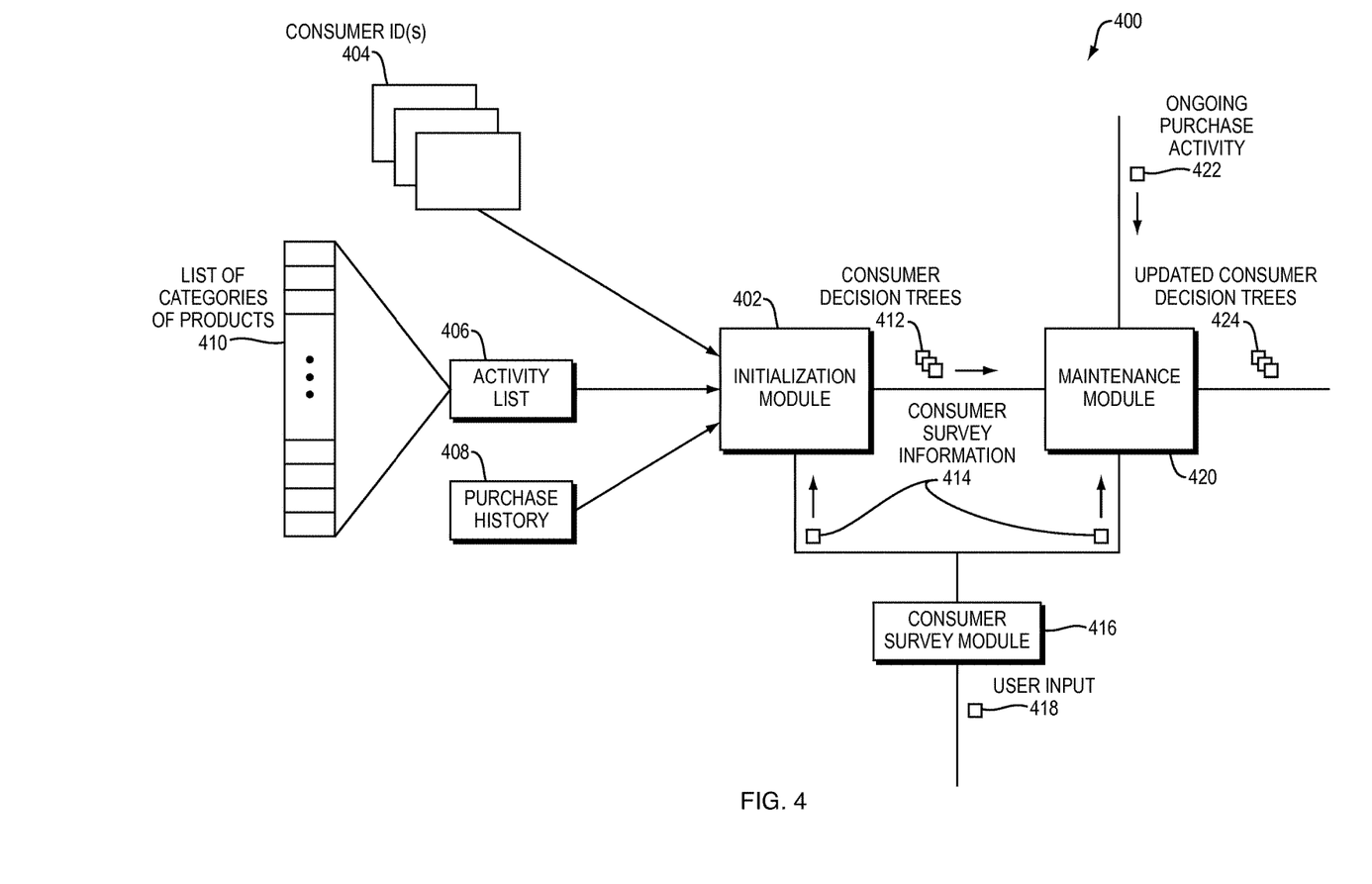
FIG. 4 is a block diagram illustrating an example embodiment of the purchasing helper employed by the present invention.

FIG. 4 is a block diagram 400 illustrating an example embodiment of the purchasing helper employed by the present invention. An initialization module 402 is configured to receive consumer ID(s) 404, an activity list 406, and a purchase history 408. The activity list 406 includes a list of supercategories and/or categories of products 410. A consumer survey module 416, based on user input 418, generates consumer survey information 414. The initialization module 402 also receives the consumer survey information 414 and generates multiple consumer decision trees 412 for each consumer of the consumer ID(s) 404. For each consumer of the consumer ID(s) 404, the purchasing helper creates multiple consumer decision trees, one consumer decision tree for each of the super categories of the listed categories of products 410.

Having individual consumer decision trees 412 for each consumer of the consumer IDs 404 and for each supercategory for each consumer allows the purchasing helper to determine specifically which decisions of the consumer drove each particular purchase for each category. This leads to greater personalization of the consumer's shopping experience. Further, individualizing the consumer decision trees allows the purchasing helper to be configured for each consumer within a household, including the household as a whole when the choice is made by a single consumer on behalf of the household. For example, a household with multiple people and/or children can have different product purchase decision processes for each consumer. Individualized and categorized consumer decision trees keep the product recommendations separate for each consumer making a purchase, leading to greater accuracy in future recommendations.

To start the shopping experience, the consumer creates a shopping list by entering or selecting a generic name of a product, a brand name of a product, or a category of a product. For example, the consumer may input a desired product brand name. The purchasing helper may employ an auto-complete method to suggest potential matches of names or products based on partially-entered product information. If the consumer has previously purchased a particular brand, the purchasing helper can display previously-purchased products/services associated with that brand with the full product/service names and/or corresponding 3D representations when available or applicable. The consumer can then select the desired product/service. If the consumer does not desire any of the displayed products/services, then the purchasing helper displays all products/services associated with the brand and their corresponding 3D representations. The purchasing helper walks along the consumer decision tree, while the consumer confirms or corrects each step, until a final product is selected. The purchasing helper works in a similar manner for categorical search.

After the consumer decision trees 412 are created by the initialization module 402, a maintenance module 420 updates the consumer decision trees 412 on ongoing basis. The maintenance module 420 also receives consumer survey information 414 from the consumer survey module 416. In one embodiment, after continued use of the purchasing helper, the consumer survey module 416 is employed less frequently because there are fewer remaining questions to ask the consumer. The maintenance module also receives ongoing purchase activity 422. Based on both the consumer survey information 414 and the ongoing purchasing activity 422, the maintenance module 420 updates the consumer decision trees 412 to create an updated consumer decision tree 424.

Figure 5:
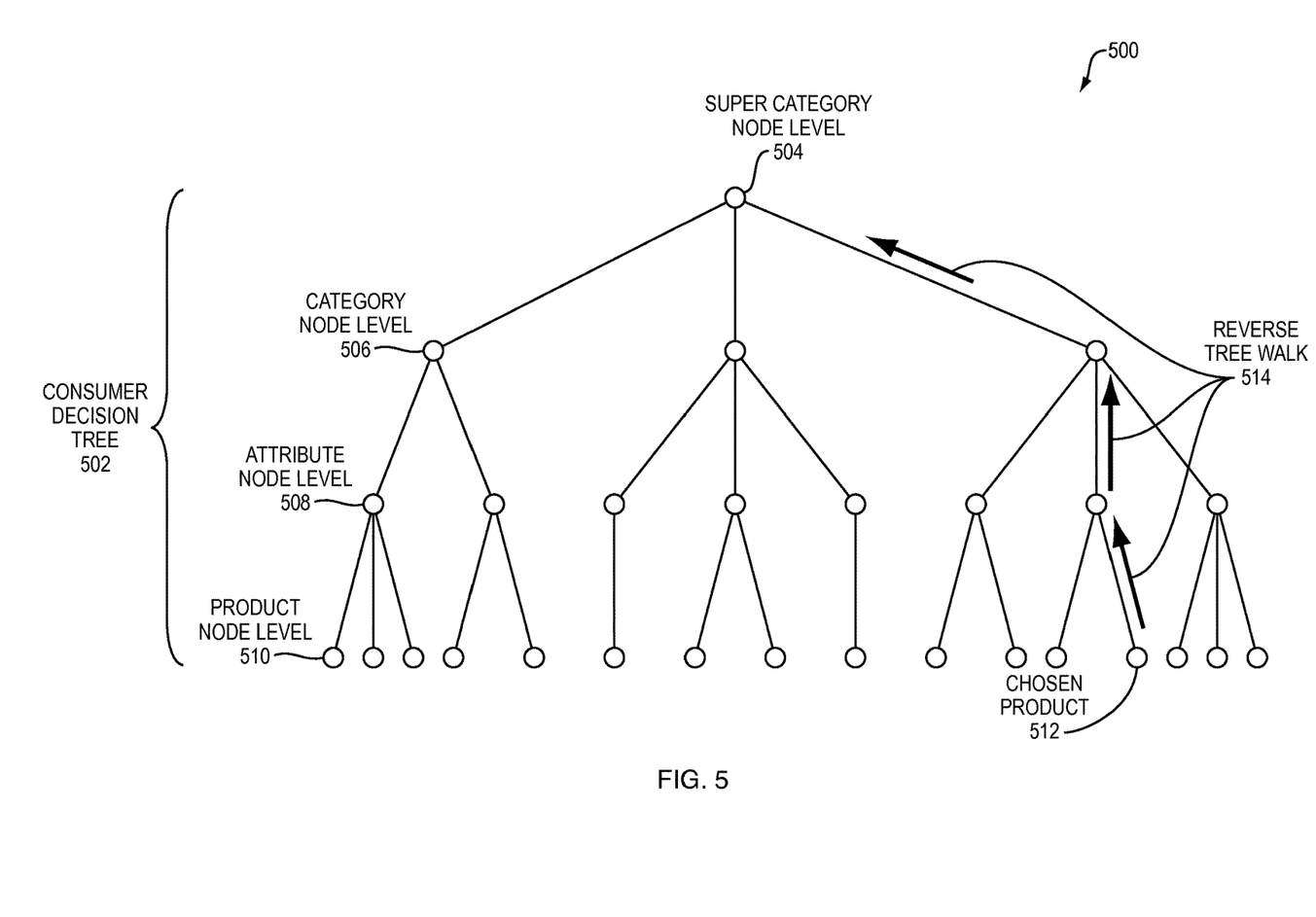
FIG. 5 is a diagram illustrating an example embodiment of a consumer decision tree according to an embodiment of the present invention.

FIG. 5 is a diagram 500 illustrating an example embodiment of a consumer decision tree 502 according to an embodiment of the present invention. The consumer decision tree 502 includes a supercategory node level 504, a category node level 506, an attribute level 508, and a product node level 510. The supercategory node level 504 is a broad level of category, where the category node level 506 is a level describing products within the supercategory. The attribute level 508 includes attributes of the products such as brand, size, weight, or price. The product node level 510 includes the products themselves.

When the user selects a product, the product is a chosen product 512 of the consumer decision tree 502. The purchasing helper then executes a reverse tree walk 514 from the chosen product 512 to the supercategory node 504. The reverse tree walk 514 indicates the decision process of the user in navigating to the chosen product 512. This reverse tree walk indicates the attributes and categories that the user chose to get to the chosen product 512. This allows the purchasing helper to determine which attributes and categories are important to the user in selecting the chosen product 512. By learning the important attributes to the user, the purchasing helper can recommend products based on those attributes that the user selected in this particular purchase.

Figure 6:
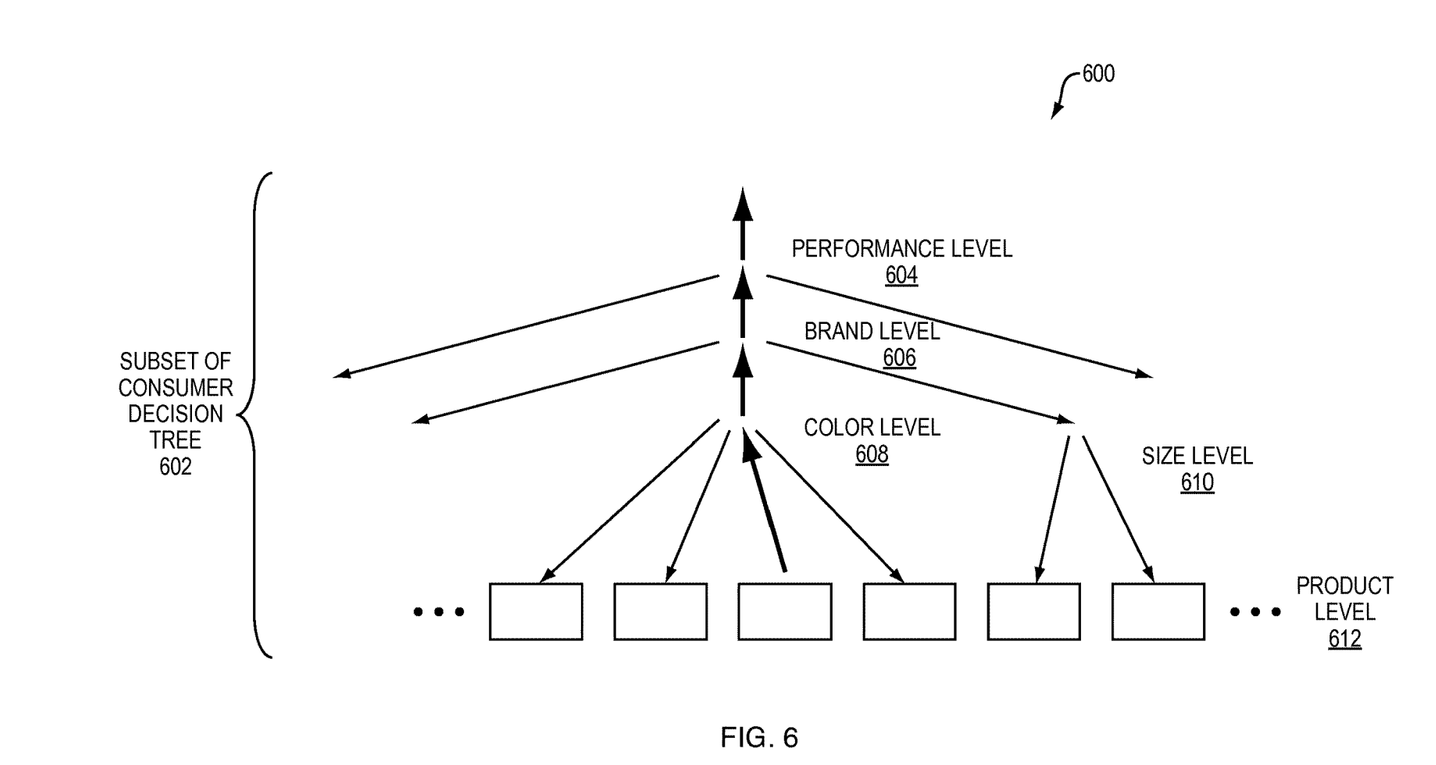
FIG. 6 is a diagram of a subset of a consumer decision tree.

FIG. 6 is a diagram 600 of a subset of a consumer decision tree 602. The subset of the consumer decision tree 602 shows various attributes within the attribute level. The attribute level of the consumer decision tree can be more than one hierarchy level. For example, the attribute level can include a performance level 604, a brand level 606, a color level 608, and a size level 610. The tree can also have multiple different attributes on the same hierarchy level in certain embodiments. The subset of the consumer decision tree 602 further includes a product level 612.

Figure 7:
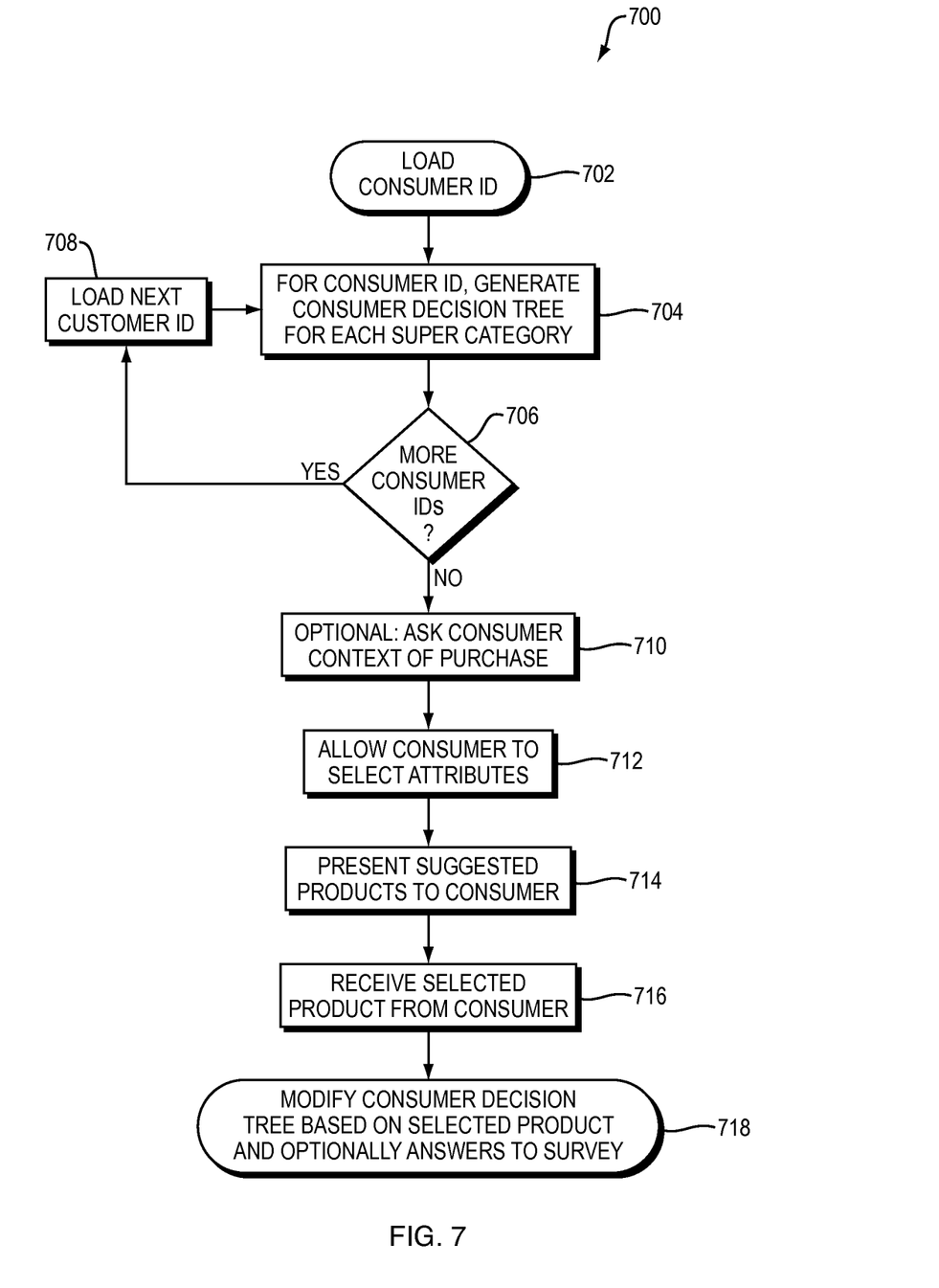
FIG. 7 is a flow diagram illustrating a process employed by an example embodiment of the present invention.

FIG. 7 is a flow diagram 700 illustrating a process employed by an example embodiment of the present invention. The purchasing helper first loads a consumer ID (702).

For each consumer ID, the purchasing helper generates a consumer decision tree for each supercategory (704). The purchasing helper then determines if there are more consumer IDs to initialize (706). If there are more consumer IDs, the purchasing helper loads a next consumer ID (708), and then generates consumer decision trees for each supercategory of that next consumer ID (704). If there are no more consumer IDs to initialize, then the purchasing helper optionally asks the consumer for a context of its purchase (710). The context of the purchase includes information such as the needs of the user, the intended use of the product, price parameters, size parameters or other information about the potential purchase.

The purchasing helper then allows the consumer to select attributes of the product (712). The purchasing helper then presents suggested products to the consumer (714). The suggested products are based on the consumer context elicited by the purchasing helper, past purchase information, and the consumer decision tree generated by the purchasing helper. Then, the purchasing helper receives a selected product from the consumer to be purchased (716). Based on the selected product, the purchasing helper modifies the consumer decision tree based on the selected product and optionally the answers to the survey (718).

Figure 8:
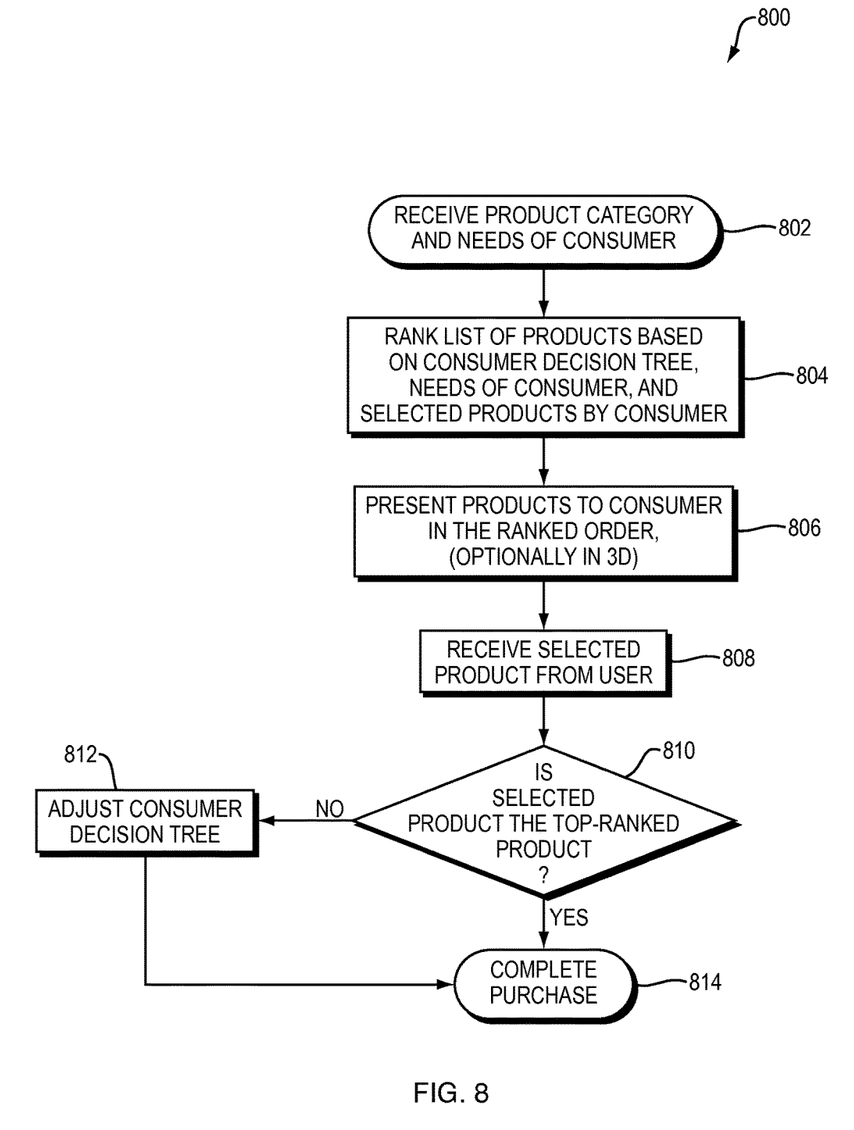
FIG. 8 is a flow diagram illustrating an example embodiment of a process employed by the present invention.

FIG. 8 is a flow diagram 800 illustrating an example embodiment of a process employed by the present invention. The purchasing helper receives a product category and needs of the consumer (802). Then, the purchasing helper ranks a list of products based on the consumer decision tree, needs of the consumer and selected products by the consumer (804). The purchasing helper then presents products to the consumer in the ranked order (optionally in 3D) (806). The purchasing helper then receives a selected product from the user (808). The purchasing helper determines whether the selected product is the top ranked product of the products presented in the ranked order (810). If the selected product is the top-ranked product (810), the purchasing helper completes the purchase (814). Otherwise, the purchasing helper adjusts the consumer decision tree to reflect the fact that the selected products should be the top-ranked product and all products ranked above the selected product should be right lower than the selected product (812). Then, the purchasing helper completes the purchase (814). In one embodiment, the purchasing helper can present a user interface enabling the consumer construct his or her own consumer decision tree by selecting attributes in a different order; for example, brand may precede function or color may precede brand. In this case, the consumer decision tree structure constructed or modified by the consumer becomes the on-going tree structure and the previous purchases and product evaluations without a purchase may be reframed with the new tree structure.

Figure 9:
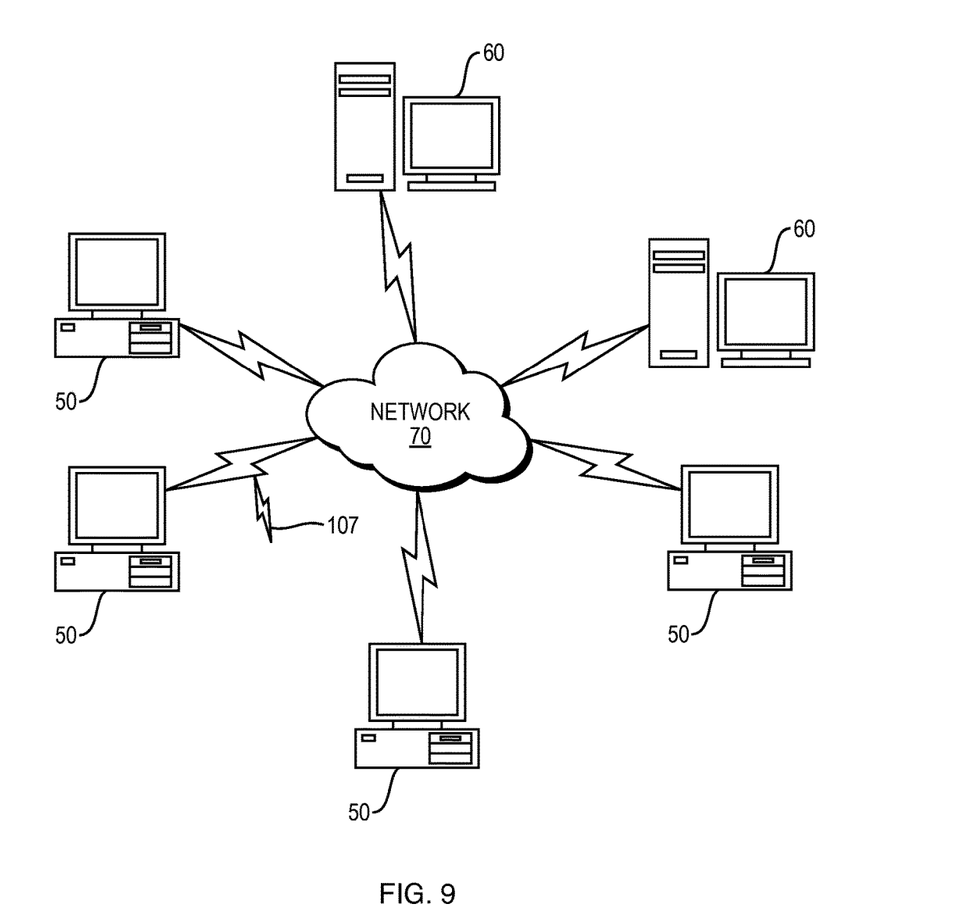
FIG. 9 illustrates a computer network or similar digital processing environment in which embodiments of the present invention may be implemented.

FIG. 9 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 10:
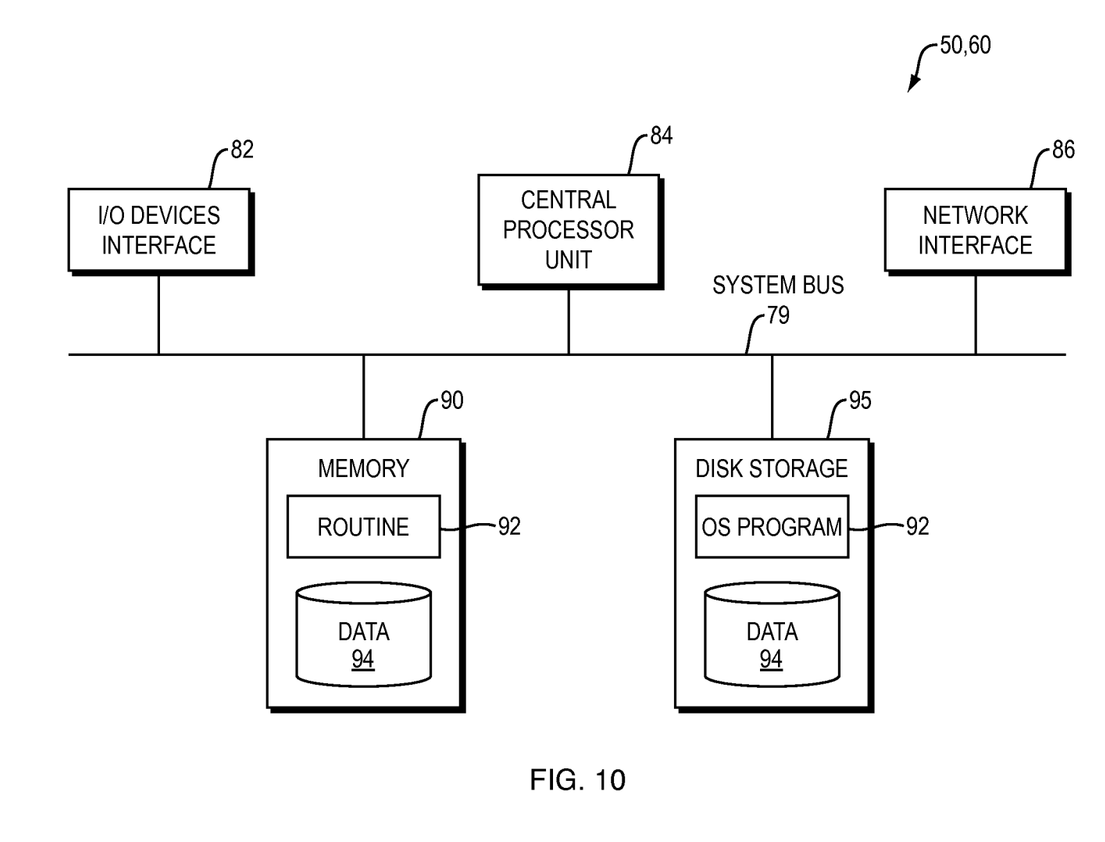
FIG. 10 is a diagram of an example internal structure of a computer (e.g., client processor/device or server computers) in the computer system of FIG. 9.

FIG. 10 is a diagram of an example internal structure of a computer (e.g., client processor/device 50 or server computers 60) in the computer system of FIG. 9. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, sensors, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
accessing, by a user device, a retailer website, causing the user device to:
present a representation of a collection of products in three dimensions, the base of each product being in a single plane, the representation of the collection free from visual obstruction from furniture and fixtures, as part of a virtual store,
enable at least one of zooming, panning, and pitch manipulation of the representation of the collection, and
enable at least one of selection, translation, rotation, and manipulation of features of each product of the collection;
monitoring, at the user device, an action of a consumer on the retailer website;
maintaining, at the user device, a database stored in a memory personal to the consumer, the database having an indication of preferences of the consumer and a purchase history of the consumer, the database based on the monitored action of the consumer;
responsive to user selection at the user device of at least one portion of the database, forwarding, from the user device, a representation of the user selected at least one portion of the database to a server;
responsively receiving, at the user device, a suggested product from the server based on the representation of the user selected at least one portion of the database; and
providing the suggested product to the consumer based on the maintained database.

2. The method of claim 1, further comprising:
enabling the consumer to select at least a portion of the database; and
enabling the consumer to share the portion of the database with a third party.

3. The method of claim 1, further comprising initializing the database based on at least one of an identifier of the consumer, a plurality of available products, and the purchase history by building a tree for a product category of each of the plurality of available products.

4. The method of claim 3, further comprising enabling selection of at least one attribute of a category of a product;
wherein maintaining the database includes maintaining the database by modifying the tree based on an order of the at least one attribute selected by the consumer.

5. The method of claim 1, further comprising:
ranking a plurality of products, each product associated with specifications and a transactional attribute, wherein the ranking is based on at least one of a past observed action of the consumer, specifications of each product, indicated needs of the consumer, and a transactional attribute of each product; and
responsive to user choice, adjusting the database based on a chosen product by the consumer.

6. The method of claim 5, wherein the transactional attribute includes at least one of a price of the product, a price per unit of the product, a payment mode of the product, a delivery mode of the product, a delivery length of the product, and delivery provider of the product.

7. The method of claim 1, wherein presenting the representation includes presenting the representation in a head worn computer.

8. The method of claim 1, wherein maintaining the database is performed by a background process monitoring the consumer's activities with one or more third-parties.

9. The method of claim 1, further comprising:
issuing, to the consumer, a question to determine a need of the consumer; and
responsive to the question, receiving an answer indicating the need of the consumer;
wherein providing the suggested product is based on at least one of the answer, specifications of the suggested product, and transactional attributes of the suggested product.

10. A system comprising:
a memory being personal to the consumer;
a user interface module configured to access, by a user device, a retailer website, causing the user device to present a representation of a collection of products in three dimensions, the base of each product being in a single plane, the representation of the collection free from visual obstruction from furniture and fixtures, as part of a virtual store, enable at least one of zooming, panning, and pitch manipulation of the representation of the collection, and enable at least one of selection, translation, rotation, and manipulation of features of each product of the collection, and further configured to monitor an action of the consumer at the user device on the retailer website;
a maintenance module configured to maintain a database, at the user device stored in the memory personal to the consumer, the database having an indication of preferences of the consumer and a purchase history of the consumer, the database based on the monitored action of the consumer; and
a product suggestion module configured to:
responsive to user selection via the user interface module of the user device of a representation of the user selected at least one portion of the database, forwarding, from the user device, at least one portion of the database to a server,
responsively receiving, at the user device, a suggested product from the server based on the representation of the user selected at least one portion of the database, and
provide a suggested product to the consumer based on the maintained database.

11. The system of claim 10, further comprising a user interface module configured to enable the consumer to select at least a portion of the database and further configured to enable the consumer to share the portion of the database with a third party.

12. The system of claim 10, further comprising an initialization module configured to initialize the database based on at least one of an identity of the consumer, a plurality of available products, and the purchase history by building a tree for a product category of each of the plurality of available products.

13. The system of claim 12, further comprising a user interface module configured to enable selection of at least one attribute of a category of a product;
wherein the maintenance module is further configured to modify the tree based on an order of the at least one attribute selected by the consumer.

14. The system of claim 10, further comprising:
a ranking module configured to rank a plurality of products, each product associated with specifications and a transactional attribute, wherein the ranking is based on at least one of a past observed action of the consumer, specifications of each product, and a transactional attribute of each product; and wherein the maintenance module is further configured to, responsive to user choice, adjust the database based on a chosen product by the consumer.

15. The system of claim 14, wherein the transactional attribute includes at least one of a price of the product, a price per unit of the product, a payment mode of the product, a delivery mode of the product, a delivery length of the product, and delivery provider of the product.

16. The system of claim 10, wherein the user interface module is further configured to present the representation in a head worn computer.

17. The system of claim 10, wherein the maintenance module is further configured to maintaining the database by employing a background process monitoring the consumer's activities with one or more third-parties.

18. The system of claim 10, further comprising:
an intelligent agent module configured to issue, to the consumer, a question to determine a need of the consumer and, responsive to the question, receive an answer indicating the need of the consumer;
wherein the product suggestion module is further configured to provide the suggested product based on at least one of the answer, specifications of the suggested product, and transactional attributes of the suggested product.

* * * * *